US010521202B2

(12) United States Patent
Andersson et al.

(10) Patent No.: US 10,521,202 B2
(45) Date of Patent: Dec. 31, 2019

(54) CUSTOMIZABLE PROJECT AND HELP BUILDING INTERFACES FOR DEPLOYABLE SOFTWARE

(71) Applicant: Coupa Software Incorporated, San Mateo, CA (US)

(72) Inventors: Arne Andersson, Uppsala (SE); Fredrik Ygge, Gothenburg (SE)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 15/818,558

(22) Filed: Nov. 20, 2017

(65) Prior Publication Data
US 2019/0155586 A1  May 23, 2019

(51) Int. Cl.
G06F 8/38 (2018.01)
G06F 3/0482 (2013.01)
G06F 9/451 (2018.01)
G06F 8/77 (2018.01)
G06F 17/24 (2006.01)

(52) U.S. Cl.
CPC .............. *G06F 8/38* (2013.01); *G06F 3/0482* (2013.01); *G06F 8/77* (2013.01); *G06F 9/453* (2018.02); *G06F 17/243* (2013.01); *G06F 17/248* (2013.01)

(58) Field of Classification Search
CPC ......... G06F 8/38; G06F 9/453; G06F 8/70–77
See application file for complete search history.

(56) References Cited

U.S. PATENT DOCUMENTS 4,789,962 A * 12/1988 Berry .................. G06F 3/04895
715/715
5,862,379 A * 1/1999 Rubin ...................... G06F 8/34
717/109

(Continued)

OTHER PUBLICATIONS

Jansen et al., Enriching software architecture documentation, published by The Journal of Systems and Software 82 (2009) pp. 1232-1248, (Year: 2009).*

(Continued)

*Primary Examiner* — S. Sough
*Assistant Examiner* — Zheng Wei
(74) *Attorney, Agent, or Firm* — Elliot H. Karlin; Hickman Palermo Becker Bingham LLP

(57) ABSTRACT

Systems and methods for providing a project building interface are described herein. In an embodiment, a server computer displays, through a graphical user interface, one or more options for defining aspects of a project. The server computer receives, through selection of the one or more first options in the graphical user interface, first user input defining particular aspects of a particular project. The server computer displays through the graphical user interface, one or more second options for defining a guide. The server computer receives, through selection of the one or more second options in the graphical user interface, second user input defining a particular guide for the particular project. The server computer receives through the graphical user interface, a request to store the particular project. The server computer stores the particular aspects of the particular project and the particular guide. When the server computer receives a request to view the particular project, the server computer displays the particular guide with the particular project.

10 Claims, 14 Drawing Sheets

(56) References Cited

U.S. PATENT DOCUMENTS

| | | | | |
|---|---|---|---|---|
| 6,005,569 A * | 12/1999 | Breggin | G06F 9/453 | 715/711 |
| 6,502,234 B1 * | 12/2002 | Gauthier | G06F 8/34 | 717/101 |
| 6,985,893 B1 * | 1/2006 | Warner | G06F 9/453 | |
| 7,024,658 B1 * | 4/2006 | Cohen | G06F 9/453 | 717/117 |
| 7,334,216 B2 * | 2/2008 | Molina-Moreno | G06F 8/35 | 717/105 |
| 7,496,888 B2 * | 2/2009 | Sanjar | G06F 8/34 | 717/100 |
| 7,764,956 B2 * | 7/2010 | Herberger | G06F 8/34 | 455/414.1 |
| 8,365,138 B2 * | 1/2013 | Iborra | G06F 8/30 | 717/104 |
| 8,756,118 B1 * | 6/2014 | Bernshteyn | G06Q 30/0633 | 705/26.1 |
| 9,031,990 B2 * | 5/2015 | Scott | G06Q 10/06395 | 705/7.41 |
| 9,489,217 B2 * | 11/2016 | Komarov | G06F 9/453 | |
| 9,582,132 B1 * | 2/2017 | Adelman | G06F 9/453 | |
| 9,785,999 B2 * | 10/2017 | Wilczek | G06Q 30/04 | |
| 10,055,223 B1 * | 8/2018 | Deol | G06F 8/77 | |
| 2002/0062475 A1 * | 5/2002 | Iborra | G06F 8/30 | 717/108 |
| 2002/0092004 A1 * | 7/2002 | Lee | G06F 8/00 | 717/140 |
| 2003/0037310 A1 * | 2/2003 | Ge | G06F 8/34 | 717/113 |
| 2004/0153992 A1 * | 8/2004 | Molina-Moreno | G06F 8/35 | 717/105 |
| 2004/0255269 A1 * | 12/2004 | Santori | G06F 8/38 | 717/109 |
| 2005/0229150 A1 * | 10/2005 | Ronnewinkel | G06F 8/34 | 717/101 |
| 2006/0236304 A1 * | 10/2006 | Luo | G06F 8/34 | 717/105 |
| 2007/0220428 A1 * | 9/2007 | Kureshy | G06F 3/04895 | 715/708 |
| 2008/0104571 A1 * | 5/2008 | Jaeger | G06F 3/0481 | 717/113 |
| 2008/0195997 A1 * | 8/2008 | Herberger | G06F 8/34 | 717/100 |
| 2008/0244416 A1 * | 10/2008 | Dumant | G06F 8/38 | 715/744 |
| 2008/0275910 A1 * | 11/2008 | Molina-Moreno | G06F 8/35 | |
| 2009/0013309 A1 * | 1/2009 | Shavlik | G06F 8/34 | 717/120 |
| 2009/0132995 A1 * | 5/2009 | Iborra | G06F 8/30 | 717/106 |
| 2010/0306249 A1 * | 12/2010 | Hill | G06Q 30/02 | 707/769 |
| 2012/0324377 A1 * | 12/2012 | Allington | G06F 8/38 | 715/763 |
| 2017/0060726 A1 * | 3/2017 | Glistvain | G06F 11/3664 | |
| 2018/0164970 A1 * | 6/2018 | Volkerink | G06F 3/0484 | |

OTHER PUBLICATIONS

Meservy et al., Transforming Software Development: An MDA Road Map, published by the IEEE Computer Society, pp. 52-58 (Year: 2005).*

* cited by examiner

| N2 | Data & Documents | Sourcing setup | Messages | Bids & Submissions | Analysis | Reports |

Fact Sheets

Fact Sheets
Templates

Constants

| Constants | [Create Constants] [↥] [▽ Filter constants ▶] | | |
|---|---|---|---|
| Team Documents | Field name | Data type | Value |
| | Item Description<br>item_description | A<sub>BC</sub> | "20 containers from X to Y" ✎ |
| Agreement<br>Documents | Auction starts<br>auction_starts | 🗓 | Jun 12, 2017 12:06 pm<br>4 months ago ✎ |
| | Starting price<br>starting_price | ¹2₃ | 600 ✎ |
| Information<br>Documents | Price update interval (minutes)<br>price_update_interval_minutes | ¹2₃ | 1 ✎ |
| | Bid change<br>bid_change | ¹2₃ | 5 ✎ |
| | Max number of price changes<br>max_number_of_price_changes | ¹2₃ | 100 ✎ |

DATA FIELDS 302

DATA TYPES 304

DATA VALUES 306

DATA FIELD CREATION INTERFACE
502

| | | | | GUIDE NAME 902 |
| | | | | STEP NAME 904 |
| | | | | PAGE IDENTIFIER 906 |
| | | | | TEXT CONTENT 908 |
| | | | | TEXT CONTENT 908 |

New Demo | Data & Documents | Sourcing setup | Messages | Bids & Submissions | Analysis | Reports ◄ Dutch Auction
1. Set auction parameters
Page for this step
Constants ▼

14▼ B U X₂ X² ≡ ✎
The parameters controlling the auction are defined as project constants.
To edit a value, click the pen icon next to the value.
The values are:
+Add Content Item Description
14▼ B U X₂ X² ≡ ✎
Give a short description of the auctioned item.
+Add Content Auction Starts
14▼ B U X₂ X² ≡ ✎
Time and date when the price ← Previous          Next →

Fact Sheets — Constants
Fact Sheets Templates — Create Constants | ▼ Filter constants
Constants

| Field name | Data type | Value |
|---|---|---|
| Item Description item_description | ABC | "20 containers from X to Y" ✎ |
| Team Documents | | |
| Auction starts auction_starts | 📅 | Jun 12, 2017 12:06 pm 4 months ago ✎ |
| Agreement Documents | | |
| Starting price starting_price | 1₂3 | 600 ✎ |
| Price update interval (minutes) price_update_interval_minutes | 1₂3 | 1 ✎ |
| Bid change bid_change | 1₂3 | 5 ✎ |
| Information Documents | | |
| Max number of price changes max_number_of_price_changes | 1₂3 | 100 ✎ |

| | | | | |
|---|---|---|---|---|
| ⊞ New Demo | Data & Documents | Sourcing setup | Messages | Bids & Submissions  Analysis  Reports |

| | | | |
|---|---|---|---|
| Fact Sheets | Constants | | ⬛ |
| Fact Sheets Templates | Create Constants ⬇ ▽ Filter constants ▼ | | ≡ ≡ |
| Constants | Field name | Data type | Value |
| | Item Description  item_description | $A_{BC}$ | "20 containers from X to Y" ✎ |
| Team Documents | Auction starts  auction_starts | 🗓 | Jun 12, 2017 12:06 pm  4 months ago ✎ |
| Agreement Documents | Starting price  starting_price | $1_{23}$ | 600 ✎ |
| | Price update interval (minutes)  price_update_interval_minutes | $1_{23}$ | 1 ✎ |
| Information Documents | Bid change  bid_change | $1_{23}$ | 5 ✎ |
| | Max number of price changes  max_number_of_price_changes | $1_{23}$ | 100 ✎ |

◉ Help

◀ Dutch Auction

1. Set auction parameters

Page for this step
Constants ▼

14▼ B U X₂ X² ≡ ✐

The parameters controlling the auction are defined as project constants.
To edit a value, click the pen icon next to the value.
The values are:
≡

+Add Content

Add Section:
Text
Expandable Text
Image
Thumbnailed Image
Popup image
Document Run Batch
Export FactSheet
Import FactSheet
Reference to a Project Document
Link to System Guide
Link to Platform Guide
Link to Project Guide

CONTENT ADDITIONS 1002

FIG. 10

| | | | | | | × |
|---|---|---|---|---|---|---|
| ⊞ New Demo | Data & Documents | Sourcing setup | Messages | Bids & Submissions | Analysis | Reports |

| | | | ⊘ Help |
|---|---|---|---|
| Fact Sheets | Constants | | ◀ Dutch Auction |
| Fact Sheets Templates | [Create Constants] [⇪] [▽ Filter constants ▶] | [≡│≡] [⌸] | 1. Set auction parameters |
| | | | The parameters controlling the auction are defined as project constants. To edit a value, click the pen icon next to the value. The values are: |
| Constants | Field name | Data type | Value | ∧ ∧ ∧ ∧ ∧ ∧ Item Description Auction Starts Starting price Price update interval Bid change Max number of price changes |
| | Item Description item_description | A_B_C | "20 containers from X to Y" ✎ | |
| Team Documents | Auction starts auction_starts | ⊞ | Jun 12, 2017 12:06 pm ✎ 4 months ago | |
| Agreement Documents | Starting price starting_price | 1₂3 | 600 ✎ | |
| | Price update interval (minutes) price_update_interval_minutes | 1₂3 | 1 ✎ | |
| Information Documents | Bid change bid_change | 1₂3 | 5 ✎ | |
| | Max number of price changes max_number_of_price_changes | 1₂3 | 100 ✎ | |

| ← Previous | | | | | | Next → |
|---|---|---|---|---|---|---|

| N1 | Data & Documents | Sourcing setup | Messages | Bids & Submissions | Analysis | Reports |

Project Sheets

Batch jobs

Timeline

Bidders

[Create Job]  [▽ Filter constants ▶]

Tasks & Deadlines

| Name | Steps |

Monthly Report
Last modified: 3 minutes ago

Team

Project Settings

*Double-click to edit.*
*Click to select, CTRL-click to select multiple, SHIFT-click to select interval.*
*Right click for options.*

Activity

INSTRUCTIONS
1302

Batch Jobs

Cloning

Group Notifications

Management Tasks

My Jobs

[Add step ▶]  [Run batch job]  [Phase: Place Bids ▶]

[Add step ▶]  [Run batch job]  [Phase: RFQ ▶]

| # | Instruction | Target | Batch job |
|---|---|---|---|
| 1 | solve main scenario<br>Solve | As-is+Capacity | Monthly Report |
| 2 | run spread report<br>Generate report | General report:<br>Bid Spread | Monthly Report |
| 3 | Populate statistics table<br>Replace facts by report | General report:<br>Bid Spread | Monthly Report |

*Double-click to edit.*
*Click to select, CTRL-click to select multiple,*
*SHIFT-click to select interval.*
*Right click for options.*

CUSTOMIZABLE PROJECT AND HELP BUILDING INTERFACES FOR DEPLOYABLE SOFTWARE

FIELD OF THE DISCLOSURE

The present disclosure is in the technical field of configurable software platforms and platform interfaces. The disclosure also is in the technical field of automated software customization, and more specifically relates to human-computer interfaces for customizing software packages to different use cases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Configurable software platforms allow companies to focus on business strategies without requiring the companies to generate their own software platforms. As the needs of different types of customers may vary widely, modern software platforms are often built to be configurable to a wide variety of use cases. Software platforms that allow users to define their own variables, rules, operations, jobs, and reports are useful for providing flexibility in deployment. This allows two companies with completely different needs to use the same software, and customize projects to their own specific use cases.

Modern software platforms straddle the line between providing a robustly configurable interface and accessibility for unsophisticated users. While a configurable user interface allows for the creation of specialized aspects of a project, the user interface may be difficult to navigate for an unsophisticated user who only needs to implement a small subset of the features of the project. For instance, a sophisticated user may wish to define different types of auctions through the interface while an unsophisticated user may wish to execute one of the auctions defined by the sophisticated user.

Some software platforms attempt to solve these difficulties by providing two interfaces: a robust development interface and an easily navigable interface for the unsophisticated user. By providing two different interfaces, the software platform allows the extremely sophisticated user to define aspects of a project and the unsophisticated user to access and utilize the project.

While the two-interface approach can be useful, it essentially only envisions two types of users and two types of user operations: an extremely sophisticated user with full capabilities and users with less comprehensive understanding of the software platform, such users with domain-specific knowledge and unsophisticated users with limited capabilities. Thus, for the slightly unsophisticated user who wishes to be able to define variables without defining rules, the user must figure out how to navigate the robust development interface or ask a software developer to define the new variable for use.

Thus, there is a need for a system which provides a robust interface that is customizable to a plurality of different needs, but which is also customizable to be easily accessible and usable for all users of the interface.

SUMMARY

The appended claims may serve to summarize the disclosure.

BRIEF DESCRIPTION OF THE DRAWINGS

In the drawings:

FIG. 3 depicts an example human-computer interface that is programmed for viewing existing data fields in a project.

FIG. 4 depicts a first interface for defining a new data field.

FIG. 5 depicts a second interface for defining a new data field.

FIG. 7 depicts an interface for defining a front page of a project guide.

FIG. 9 depicts an example of defining a step through the project guide.

FIG. 10 depicts an example of the interface displaying a content menu in response to a selection of the content option.

FIG. 11 depicts an example of a guide after it has been created.

FIG. 12 depicts an example of the guide with the text boxes expanded.

FIG. 13 depicts an example of a configured batch job through the interface.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

According to an embodiment, an interface for customizing a project includes options for customizing aspects of the project and options for defining a help interface. The help interface can be tied to a specific project, a specific project type, or the system generally. The options for building the help interface may include options for selecting specific pages of the project interface to be associated with specific pages of the help interface, such that navigating to the specific page on the help interface automatically navigates to the specific page of the project interface. A user is able to define aspect of a project and a help interface for the project and then store the defined project. When a future user accesses the project, the project is displayed with the defined aspects and the help interface. Additionally, the project may be used as a template for creating new projects of the same type with the help interface describing how to customize the project to a different use.

In an embodiment, a method comprises displaying, through a graphical user interface, one or more first options for defining aspects of a project; receiving, through selection of the one or more first options in the graphical user interface, first user input defining particular aspects of a particular project; displaying, through the graphical user interface, one or more second options for defining a guide; receiving, through selection of the one or more second options in the graphical user interface, second user input defining a particular guide for the particular project; receiving, through the graphical user interface, a request to store the particular project; storing the particular aspects of the particular project and the particular guide; receiving a request to view the particular project; displaying the particular guide with the particular project.

System Overview

Figure 1:
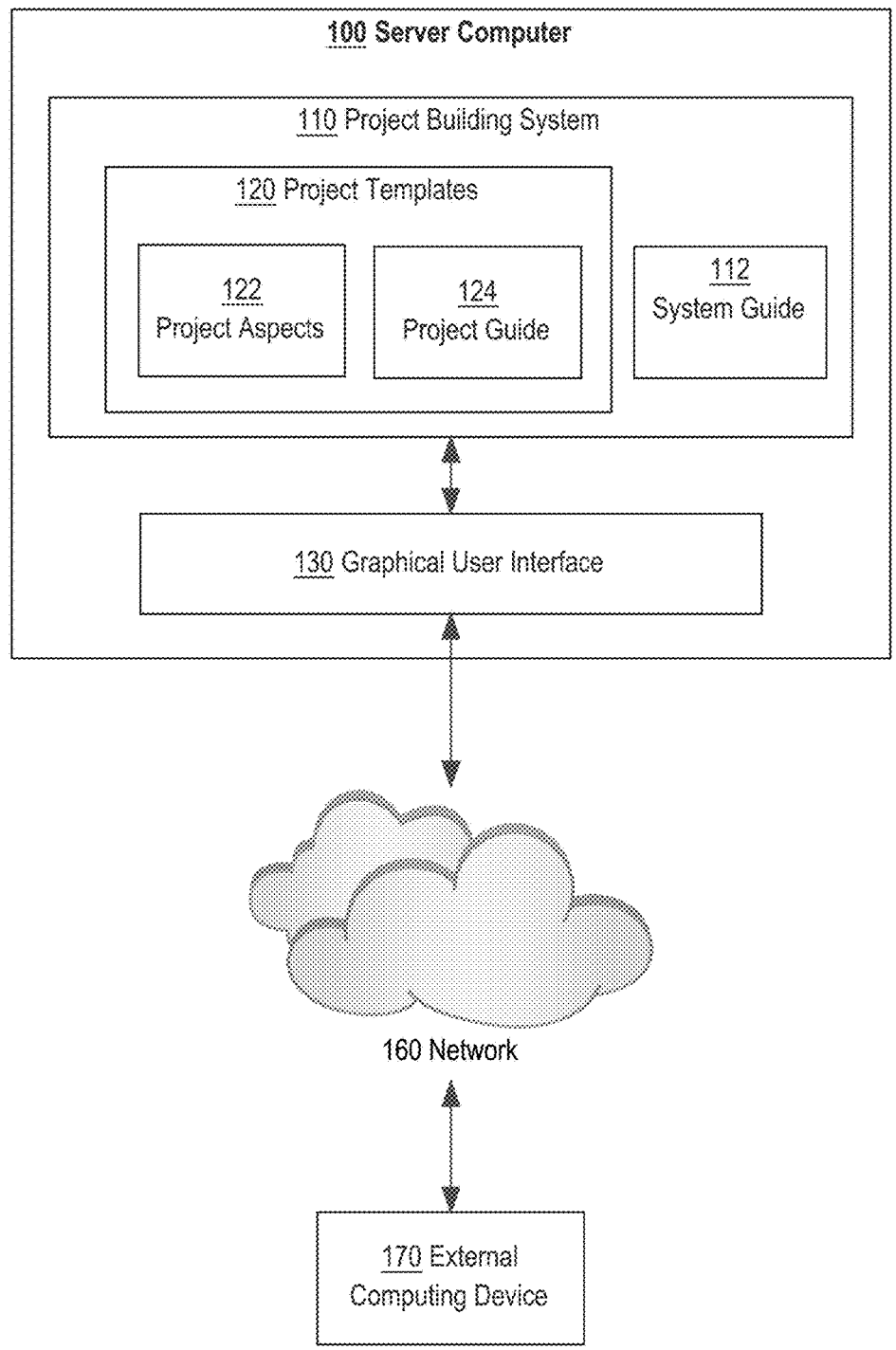
FIG. 1 depicts an example system in which the techniques described may be implemented according to an embodiment.

FIG. 1 depicts an example system in which the techniques described may be implemented according to an embodiment.

In the example of FIG. 1, a server computer 100 and an external computing device 170 are communicatively coupled to a data communications network 160. The network 160 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 100, external computing device 170, and other elements of the system may each comprise an interface compatible with the network 160 and are programmed or configured to use standardized protocols for communication across the networks such as TCP/IP, Bluetooth, and higher-layer protocols such as HTTP, TLS, and the like.

Server computer 100 may be implemented using a server-class computer or other computers having one or more processor cores, co-processors, or other computers. Server computer 100 may be a physical server computer and/or a virtual server instance stored in a data center, such as through cloud computing. The server computer 100 may be programmed or configured to display a project building system 110 and store projects generated through the project building system 110. The server computer may comprise a plurality of communicatively coupled server computers including a server computer for training the neural network and a server computer for communicating with a client computing device. Server computer 100 stores the project building system 110 and a graphical user interface 130.

Project building system 110 comprises instructions for generating an interface for building a project. A project, as used herein, refers to a particular use of a software package. For example, a project may include a six-month sourcing event, a five-minute auction, a generation of summaries and/or reports, and or other uses of a configurable software package. Projects include aspects that differentiate them from the general software package. For instance, a project may include defined variables, rules, tasks, jobs, and/or other aspects.

The project build system 110 may include options for loading existing projects and/or project templates, defining aspects of a project, defining system guides and/or platform guides, and otherwise modifying or building projects. Project building system 110 includes project templates 120 and system guides 112. System guides 112 comprise guides generated to be used on one or more different projects. System guides 112 are accessible regardless of the project being built.

Project templates 120 comprise project aspects 122 and project guides 124. Project aspects comprise generated parameters for a project of a particular project type, such as rules, content, field names, batch jobs, and other project defining aspects. Project guides 124 comprise guides generated for particular projects or project types. The project guides may describe how to implement a project that contains particular project aspects. The project guides may additionally be made accessible only when a project of the particular type is being built.

Graphical user interface 130 comprises instructions for generating an interface for selecting the project aspects, accessing and storing projects, building project and system guides, and executing rules and formulas within the projects. The graphical user interface may be configured to display guides simultaneously with the project interface. Additionally, the graphical user interface may be configured to display different pages of the interface based on a currently displayed page of a project guide.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 100.

External computing device 170 is a computer that includes hardware capable of communicatively coupling external computing device 170 to one or more server computers, such as server computer 100 over one or more service providers. For example, external computing device 170 may include a network card that communicates with server computer 100 through a home or office wireless router (not illustrated in FIG. 1) coupled to an internet service provider. External computing device 170 may be a server-class computer, smart phone, personal computer, tablet computing device, PDAs, laptop, or any other computing device capable of transmitting and receiving information and performing the functions described herein.

FIG. 1 depicts server computer 100 and external computing device 170 as distinct elements for the purpose of illustrating a clear example. However, in other embodiments, more or fewer server computers may accomplish the functions described herein. For example, a plurality of external computing devices may connect to the server computer 100. Additionally, server computer 100 may comprise a plurality of communicatively coupled server computers including a server computer for storing projects and a server computer for executing and displaying projects.

Functional Overview

Figure 2:
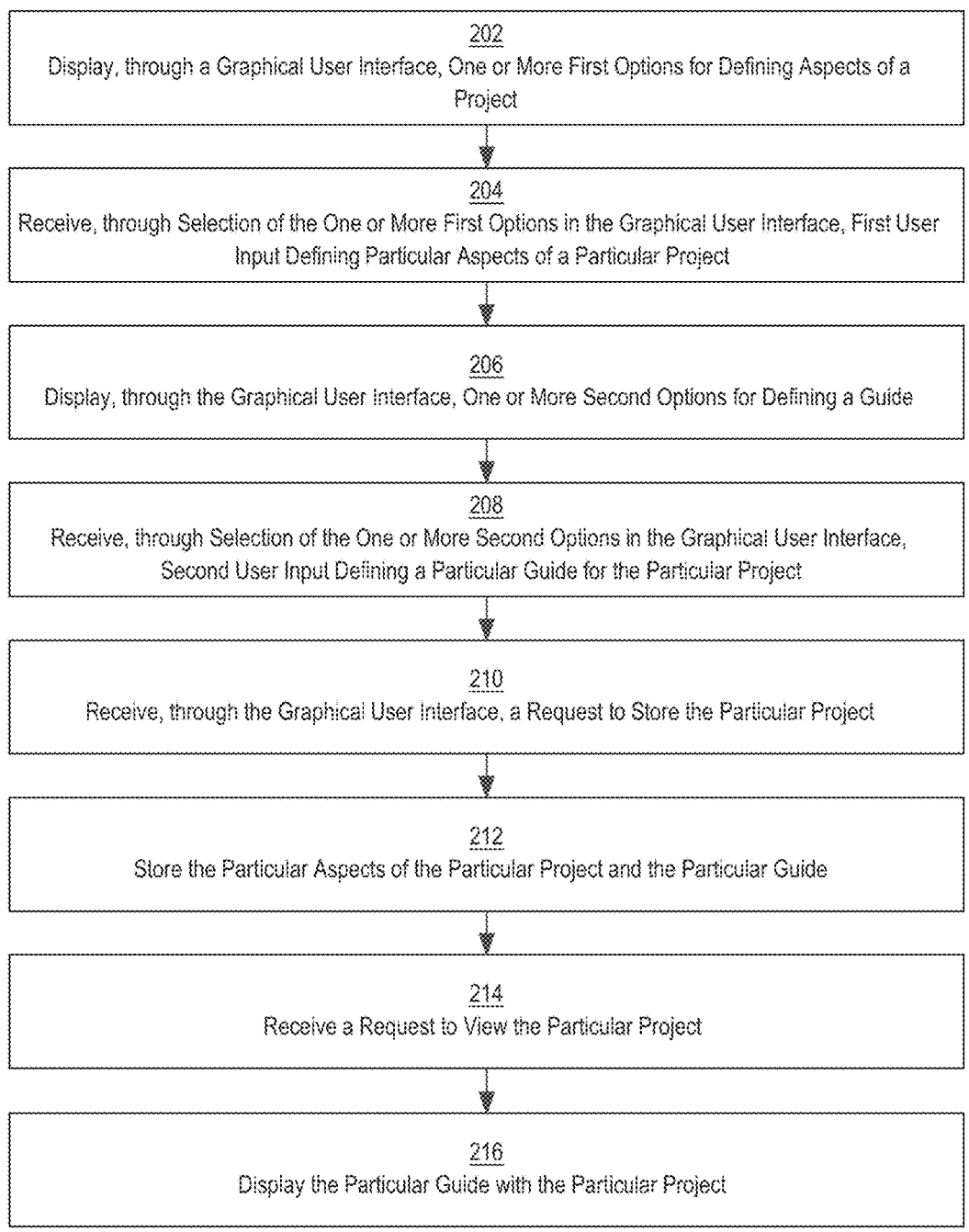
FIG. 2 depicts an example method for providing a graphical user interface for creating project guides.

The methods described herein may be used to provide a graphical user interface with a great amount of complexity which can be implemented with a guide creation system for generating usability for various types of users. FIG. 2 depicts an example method for providing a graphical user interface for creating project guides.

At step 202, one or more first options for defining aspects of a project are displayed. The aspects may include name, description, data fields, formulas, rules, batch jobs, or other parameters for a project. The interface may include options for defining aspects that can be manipulated in a particular project. For instance, a first interface may include options for defining data fields. A second interface may include options for generating rules and/or formulas that incorporate the data fields. For example, the rule interface may populate one or more drop-down menus with names of the data fields, thereby allowing a user to specify rules based on values input into the named data fields.

At step 204, first user input defining particular aspects of a particular project are received through a selection of the one or more first options in the graphical user interface. The aspects may be defined to be specific to a particular type of project. Thus, for a sourcing event project, a user may define fields for describing items, options for selecting providers, and rules for performing the sourcing event. Methods for defining aspects of a project are described further herein.

At step 206, one or more second options for defining a guide are displayed through the graphical user interface. The options for defining the guide may include options for naming the guide, options for associating the guide with a particular project, options for generating different steps, options for incorporating outside content into the guide, and/or options for linking one or more steps of the guide to one or more pages of the interface.

At step 208, second user input defining a particular guide for the project is received through selection of the one or more second options in the graphical user interface. For example, the server computer may receive input from a client computing device executing the graphical user interface which defines one or more parameters of the guide. In an embodiment, the second user input further includes input linking the guide to the particular project. The second input may additionally include input tying one or more steps of the guide to one or more pages of the interface.

At step 210, a request to store the particular project is received through the graphical user interface. For example, the server computer may receive a request to save the project and guide from a graphical user interface. In an embodiment, the request to save the project comprises a request to save the project as a project template. The project template may be used by other users as a starting point for a project without causing changes to the project template.

At step 212, the particular aspects of the particular project and the particular guide are stored. For example, the server computer may store the data as a project and/or project template. A project template may comprise aspects of a project that have not been personalized to a particular implementation. The project template may thus include a project guide that instructs a user how to personalize the project.

Stored projects and/or project guides may be edited, downloaded, uploaded, and/or copied to different projects in the platform. Downloaded guides may be edited outside of the platform and then reuploaded. In an embodiment, the server computer generates copies of existing projects and/or project guides so that edits may be stored without affecting the original guide. Thus, a user may remove a step of a guide that does not apply to the user's specific implementation without affecting the stored guide for other users.

At step 214, a request to view the particular project is received. For example, the server computer may receive a request to open a new project based on a project template. The server computer may display one or more project template selection options on the graphical user interface. The displayed project template selection options may identify different project templates that are available to the requesting user.

At step 216, the particular guide is displayed with the particular project. For example, in response to a selection of a project template, the server computer may access the aspect data and load a new project with the created project aspects. Additionally, if a project guide was linked to the project, the server computer may display the project guide in tandem with the project. Thus, the system described herein allows a user to generate a template through an interface and generate a guide which describes to a user how to use the template. Methods for defining the project template and defining the project guide are described further herein.

Defining a Project Template

In an embodiment, server computer 100 provides project building system 110. Project building system 110 includes options for selecting existing project templates 120 and/or system guides 112. The existing project templates 120 comprise aspects of a specific project type. The project templates allow a user to generate a project of different project types without requiring the user to understand how to define the aspects of the project type. This allows the server computer 100 to provide a robust interface with adaptive usability depending on the needs of the user while concurrently allowing the interface to be accessible to various types of users.

As an example, the project building system may comprise an interface which includes options for defining input types, rules, jobs, and other aspects of projects. If a user wished to create a Dutch auction project, a normal user would need to define different data types relating to the auction, such as a description of an object, a starting price, a bid change amount, and a temporal interval for updating the price. Additionally, the user may need to define a series of rules for a Dutch auction, such as a rule defining price decrease (or increase) over time and a rule specifying that the first bidder wins the auction. Once a Dutch auction template is created, a second user may load the Dutch auction template and generate a Dutch auction without defining each type of aspect.

Figure 4:
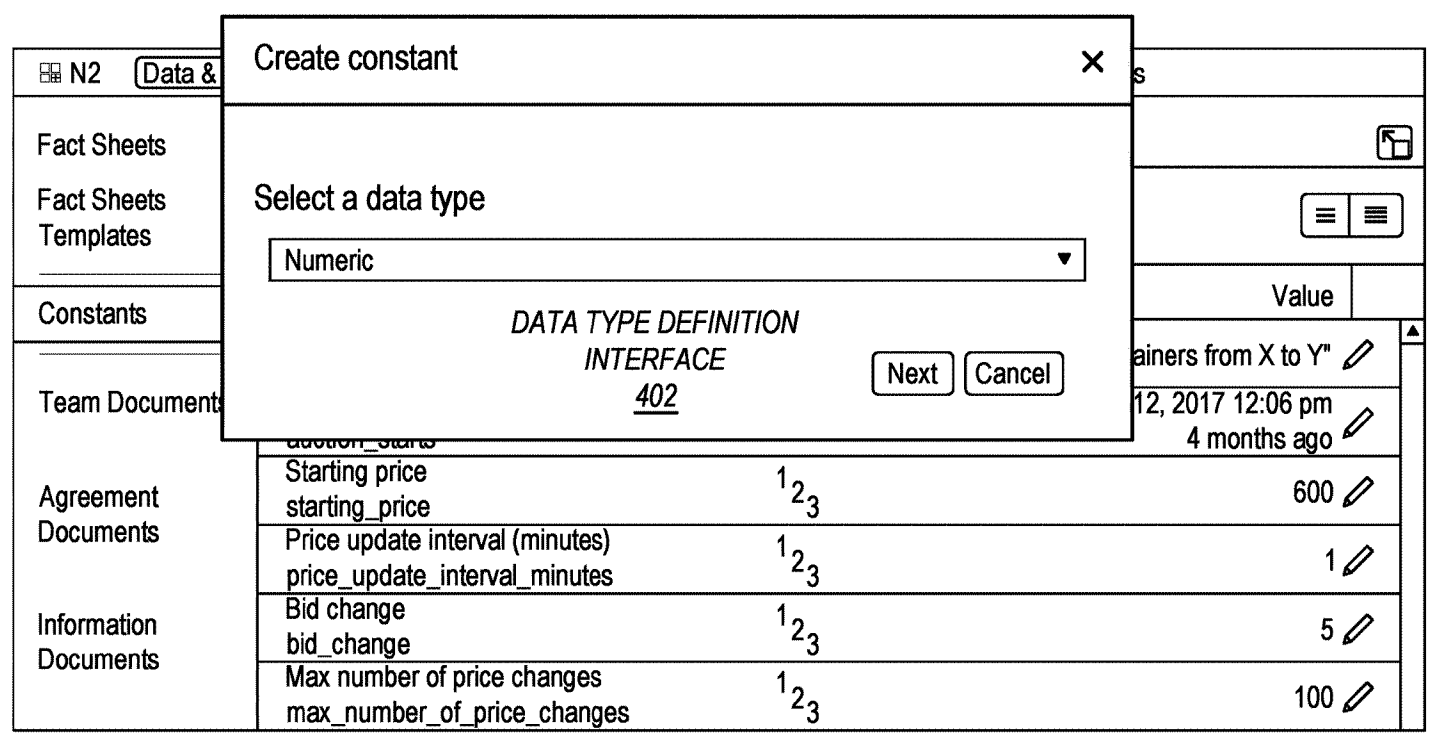
Figure 5:
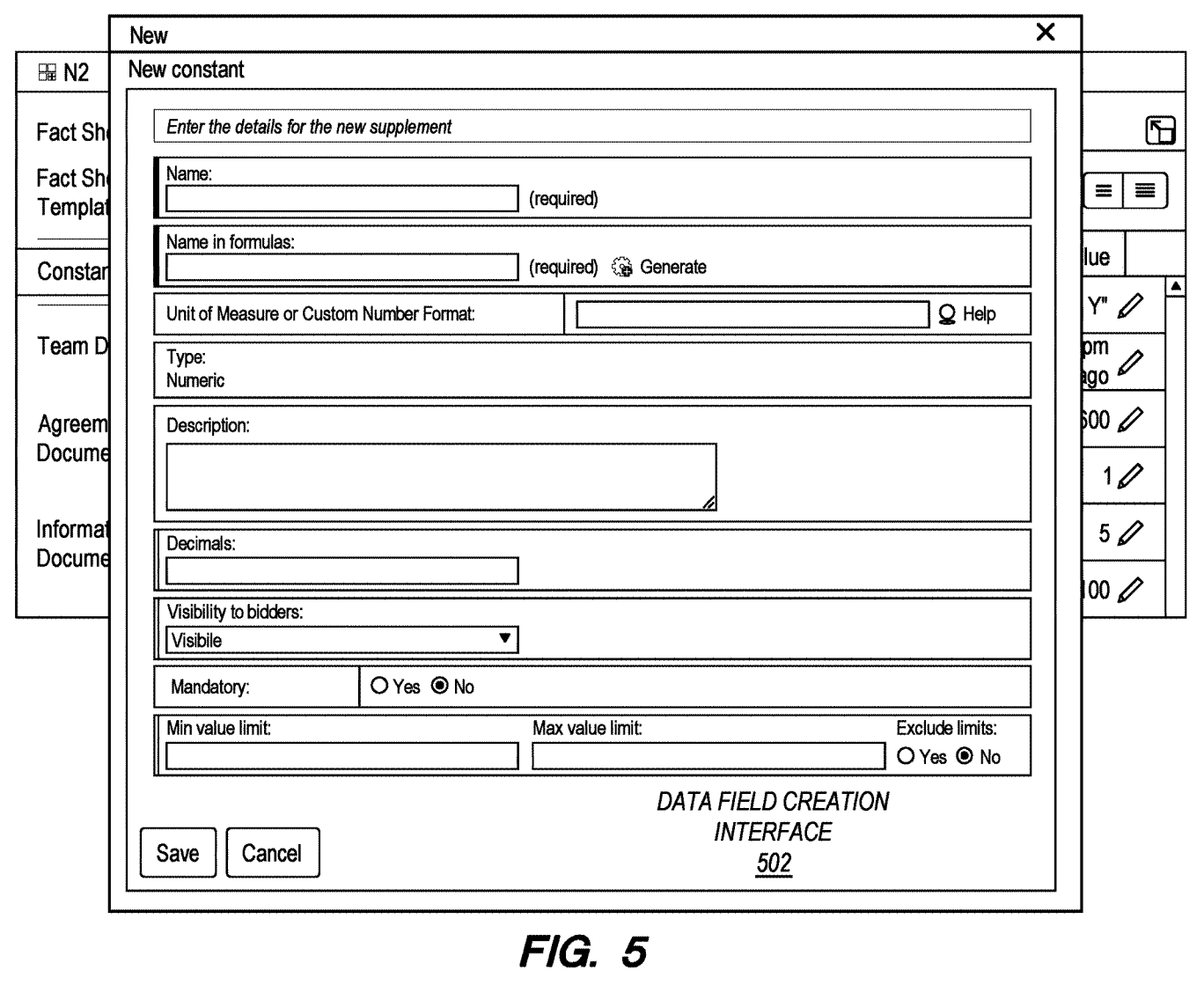

FIG. 3, FIG. 4, FIG. 5 depict an example interface for defining aspect of a project type. FIG. 3 depicts an example interface for viewing existing data fields in a project. The interface of FIG. 3 includes data fields 302. Each of data fields 302 include a data type 304 and a data value 306. The data fields 302 that have been created for the specific project are Item Description, Auction starts, Starting price, Price update interval (minutes), Bid change, and Max number of price changes. The Item Description data field includes a string data type whereas the Auction starts field includes a date data type and the remaining fields include numeric data types. Thus, the "Bid change" field may require numeric input.

While the field names and data type may not change between different projects of the same project type, the values for the fields may be unique to each project. Thus, a user of the system may update the data values 306 for each field in order to personalize the project to their specific needs. For example, a user may select the data value for the Item Description field in order to identify the particular product being auctioned through the Dutch auction. The user may then type in a description of the particular product and/or supply request being auctioned.

FIG. 3 additionally includes a "create constant" option. In response to a selection of the "create constant" option, the interface may display options for creating a new data field. FIG. 4 depicts a first interface for defining a new data field. In FIG. 4, data type definition interface 402 may be used to define a data type for the new data field. For example, a new data field may define a number of an item. Thus, through the data type definition interface, the user may select "numeric" from the drop-down menu in order to set the data type as a number.

FIG. 5 depicts a second interface for defining a new data field. While FIG. 4 and FIG. 5 are displayed as two interfaces, in other embodiments the options for defining a data field may be included in a single interface or in three or more interfaces. Data field creation interface 502 includes options for defining a data field. The "name" option allows the user to define the name of the field as displayed. The "name in formulas" option allows the user to define a name for reference in different formulas or rules. For example, a rule for a Dutch auction may state "Every price_update_interval_minutes: price=current_price−bid_change." In the current example, the formula name for the bid change data field is "bid_change." Additional options in the data field creation interface allows a user to define a description of the field, to set the field as mandatory, and to set minimum and maximum values.

The project interface may additionally include options for defining scenarios. A scenario, as used herein, refers to an executable set of instructions that cause the server computer to implement one or more rules. For example, a "cherry pick" scenario may include one or more rules for selecting the best entries of a set based on one or more criteria. A "two winners" scenario may include one or more rules for selecting a limited number of suppliers when two or more suppliers are selected for different items. The interface may include options for defining scenarios using predefined logical operators.

The interface may additionally include options for solving scenarios. For example, once a scenario is defined, a "solve scenario" option may be displayed on the interface. In response to receiving a selection of the "solve scenario" option, the server computer may implement the one or more rules of the scenario. By providing options for generating a plurality of scenarios, the interface provides additional flexible to the users. A user is thus capable of solving a plurality of scenarios to retrieve different results.

The project interface may additionally include options for generating batch jobs. A batch job, as used herein, refers to a plurality of scenarios and/or rules that are executed in a particular order. The rules in the batch job may include solving scenarios, generating reports, or otherwise editing documents with data from a report. FIG. 13 depicts an example of a configured batch job through the interface. The interface in FIG. 13 depicts a Monthly Report batch job. The batch job comprises a plurality of instruction 1302. The add step option allows the user to add additional steps to the batch job. In the batch job of FIG. 13, the first instruction causes the server computer to solve the main scenario. The second instruction causes the server computer to generate a bid spread report. The third instruction causes the server computer to populate a statistics table with the elements of the bid spread report.

By generating a batch job, a user is able to execute a plurality of different instructions efficiently when the instructions take different periods of time. For example, if each of the instructions in FIG. 13 took an hour to execute, the server computer would be able to execute the batch job in three hours using the methods described herein. If the batch job was not available, a user would have to continually check the server computer to determine when the main scenario was solved and manually select the next job to run. Thus, by adding the option to run a batch job of a plurality of scenarios, the interface increases the efficiency of the computing device in executing multiple rules generated by the user. The flexibility of the system additionally allows a user to create a chain of events by specifying different types of rules to be executed in different orders.

When the aspects of a project are completed, the user may store the project as a project template. Storing the template may comprise storing the individual aspects that were generated for the project, such as defined fields and rules. Thus, the Dutch auction template may be made available for other users to access in order to create a Dutch auction. Depending on the complexity of the interface, a project template may not be easily navigable for generating a project. For example, the interface in FIG. 3-5 are displayed based on a selection of a single option of a plurality of options from a single menu of a plurality of menus, i.e. the Constants option from the Data & Documents menu. Thus, an unsophisticated user may still have trouble identifying what data to add to the project, how to execute the project, and where to navigate to in the project to perform these functions.

Defining a Guide

In an embodiment, the server computer 100 provides options through the graphical user interface for defining a guide. The interface may display options for defining a project guide or a system guide. A system guide may be a general guide which does not rely on a specific project template. For example, a guide may be created for generating batch jobs from a plurality of jobs, tasks, or other functions. The guide may describe how to generally create initial functions and how to combine them into a batch job. As the batch jobs guide is not specific to any single project, the guide may be created as a system guide which is accessible to users regardless of the project that is being created.

A project guide is a guide created for a specific project. The project guide may rely on the existence of aspects that were generated for the specific project. In the example of the Dutch auction, a project guide may specify how a user is to personalize the generic Dutch auction to a specific use case. Thus, a Dutch auction project template may include the rules defining how the Dutch auction operates and which constants are included in the Dutch auction. The guide may then indicate how to specify parameters for a particular Dutch auction, how to begin the bidding, monitor the bidding, and execute the rules to determine the results of the Dutch auction.

Figure 6:
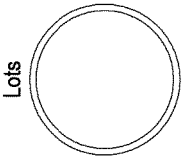
FIG. 6 depicts an interface for creating a project guide.

FIG. 6 depicts an interface for creating a project guide. FIG. 6 includes help interface 602 and guide creation option 604. Help interface 602 includes options for opening any of a plurality of existing guides. Help interface 602 may also include options for creating new system guides and creating new project guides. Upon receiving a selection of the option for creating a new project guide, server computer 100 causes display of guide creation option 604. Guide creation option 604 comprises options for generating a new guide. The guide creation option 604 includes an option for creating a new guide or importing existing guides.

Figure 7:
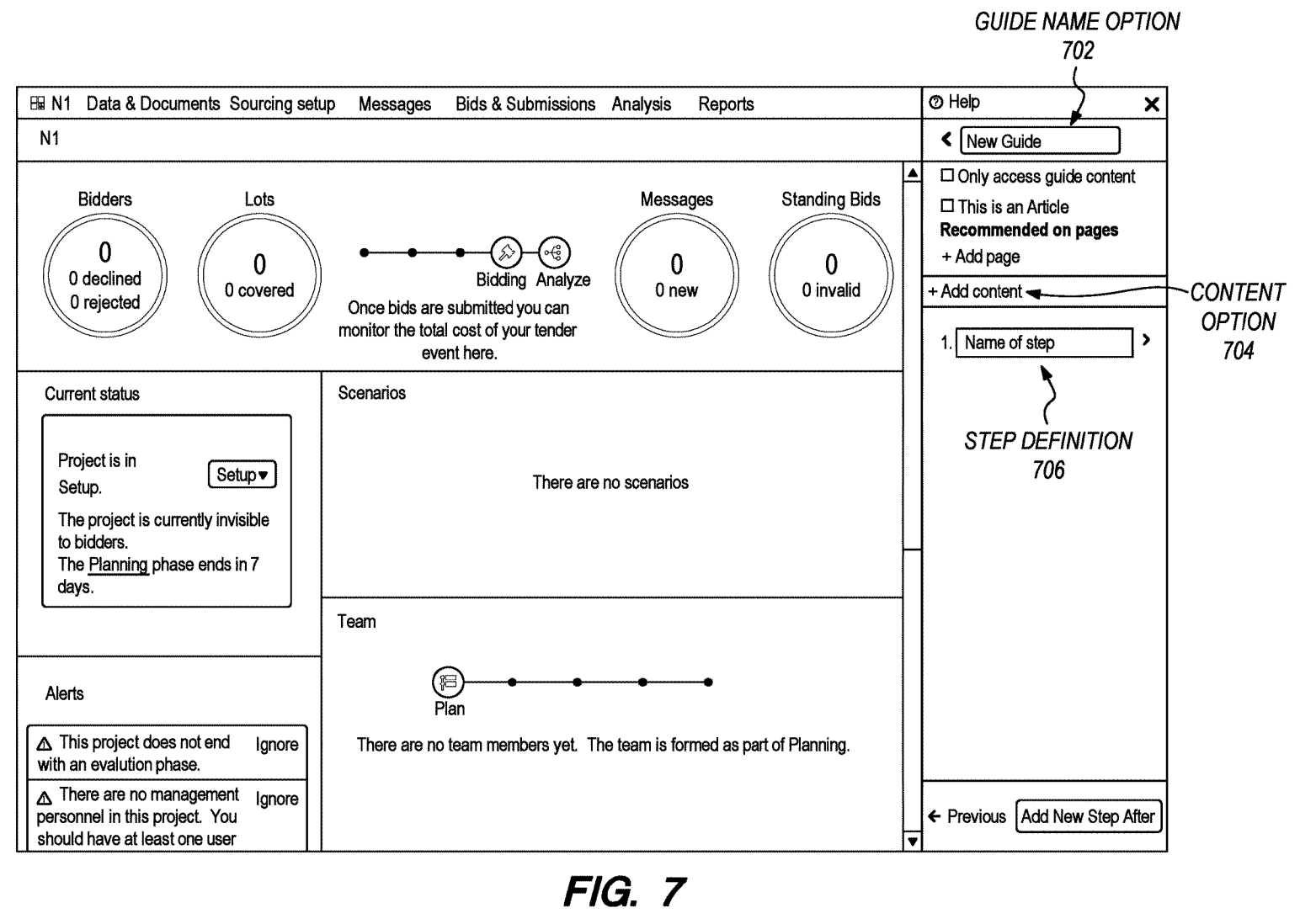

In response to a selection of the option for creating a new guide, the server computer 100 causes displaying additional guide creation options. FIG. 7 depicts an interface for defining a front page of a project guide. FIG. 7 includes guide name option 702, content option 704, and step definition 706. Guide name option 702 allows a user to specify a name for the guide. Content option 704 allows a user to add content to the front page of the guide. Content may include text, documents, images, music, selectable options, and other content elements displayable through the guide. Step definition 706 allows the user to input individual step names into the guide. The step names may then be displayed on the step pages of the guide. Additionally or alternatively, the user may skip defining the step on the front page of the guide and instead define the new steps as they are created. The server computer 100 may then update the names of the steps on the front page of the guide to match the steps on the subsequent pages.

Figure 8:
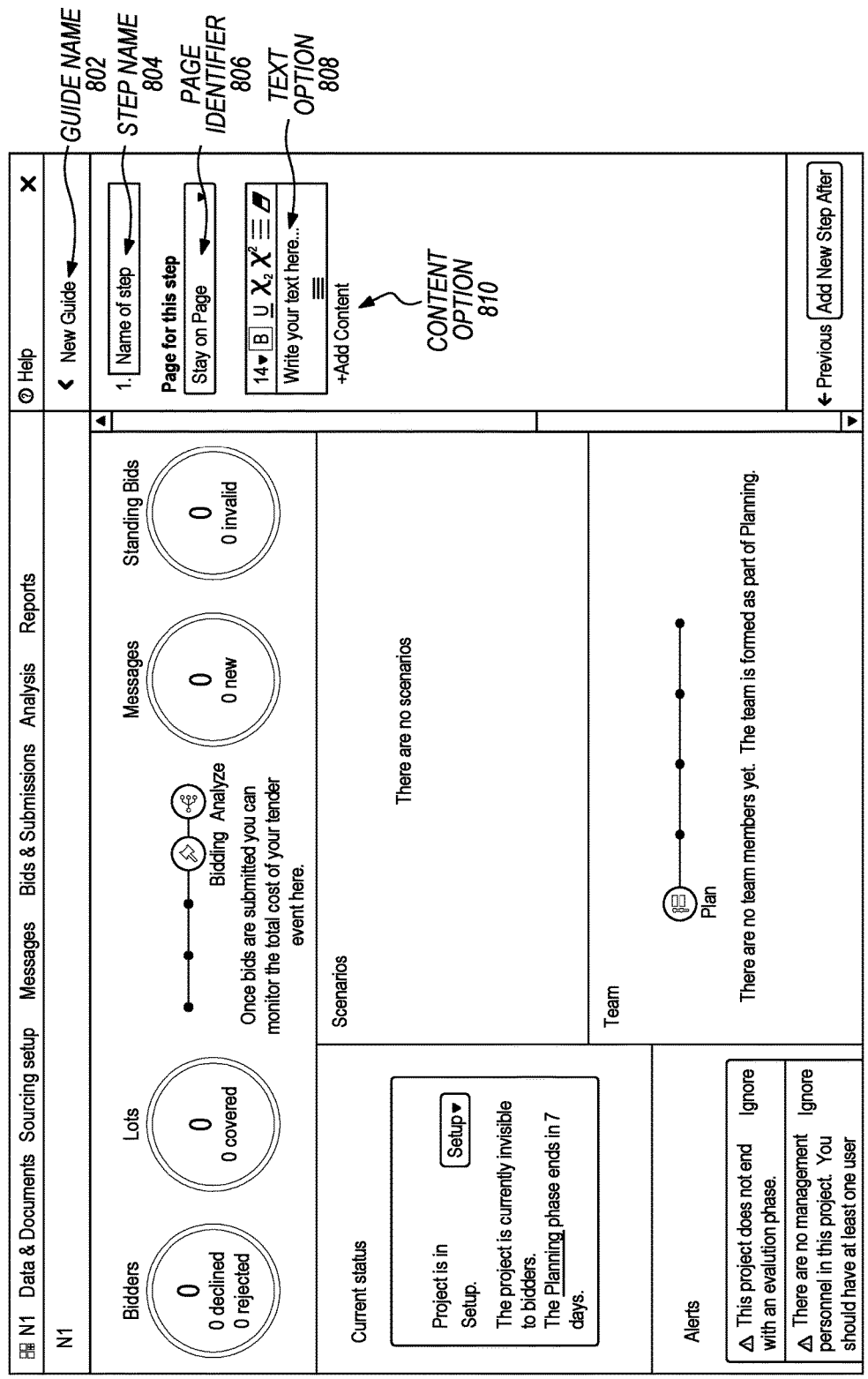
FIG. 8 depicts an interface for defining a step of a project guide.

FIG. 8 depicts an interface for defining a step of a project guide. FIG. 8 includes guide name 802, step name 804, page identifier 806, text content 808, and content option 810.

Guide name 802 identifies the current guide. Step name 804 allows the user to generate a title for the step. Additionally or alternatively, the title for the step may be defined in FIG. 7. Text content 808 includes an editable text box which allows a user to specify content to be displayed in the current page of the guide. Finally, content option 810 allows a user to add content to the current page of the guide.

Page identifier 806 includes a drop-down menu identifying the different navigable pages of the interface. As used herein, a page refers to a separate display of the interface which is selectable through the options of the interface. For example, the page displayed in FIG. 8 next to the help option is a home page while the page displayed in FIG. 3 is the Constants page which is selectable through the Data & Documents tab. A page that is selected through the drop-down menu may be linked to the guide when the guide is stored. For example, if the Constants page is selected for step 1 when the guide is stored, then the server computer 100 may store data associating the Constants page with step 1. Alternatively, instead of selecting a page from the drop-down menu, the user may navigate to the page through the interface and select the Stay on Page option from the drop-down menu. The server computer may then identify the current page and save data associating the guide step with the current page.

By associating guide steps with particular pages, the server computer 100 is able to display appropriate pages with appropriate steps of the guide. For example, when a user selects a step of the guide, the server computer 100 may identify the page of the interface associated with the step of the guide and navigate to that page. This allows a user to step through the guide without needing to navigate to the correct page. Thus, generating the guide can include identifying the steps a user needs to perform, identifying pages of the interface where the steps are performed, and storing data which displays both the step and the page to the user when the step is selected.

FIG. 9 depicts an example of a step being defined through the project guide. FIG. 9 specifically depicts creation of a guide for the Dutch auction example. In FIG. 9, guide name 902 identifies the guide as a Dutch Auction guide. Step name 904 identifies the first step as "Set auction parameters." As the auction parameters are defined on the Constants page, the page identifier 906 identifies the Constants page. Finally, text content 908 describes the steps for setting the auction parameters. The example of FIG. 9 is a project guide for the Dutch auction project template. Thus, the individual fields of the Constants interface have already been defined.

The guide is able to rely on the pre-existence of aspects of the project that were created as part of the project template. The guide can then describe how to personalize the project template to a specific iteration of the project while providing the general aspects of the project.

The text content 908 in FIG. 9 includes two different types of text inputs. The first text input provides pure text to the user. The second text input is an expandable text input. Thus, the interface allows a user to define an expandable option, such as "Item Description," and define text to be displayed when the option is expanded. In the guide of FIG. 9, when "Item Description" is expanded, the interface displays the text stating "Give a short description of the auctioned item."

Different types of content items may be added to the interface through a content option. FIG. 10 depicts an example of the interface displaying a content menu in response to a selection of the content option. Content additions 1002 include text and expandable text as described above. Additional options include options to upload images, image thumbnails, popup images, and documents. Additionally, the guide may contain hyperlinks, such as links to websites and/or other guides. Guides may also contain a hierarchical format, such that a first guide is a sub-guide and/or step of a second guide. Thus, selection of a link in a step of the second guide may cause display of the first guide.

Figure 12:
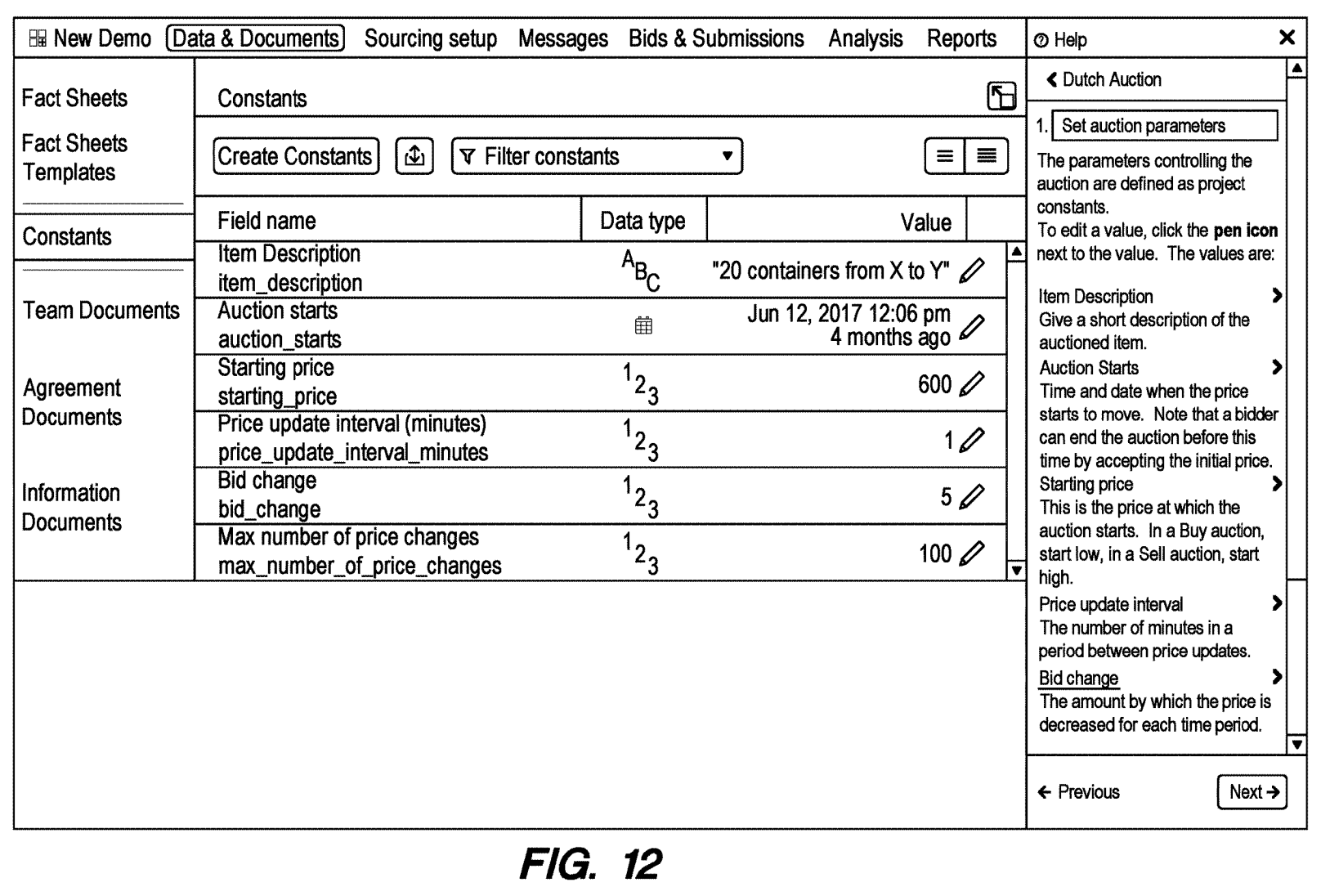

FIG. 11 depicts an example of a guide after it has been created. The guide of FIG. 11 corresponds to the guide being created in FIG. 10. In FIG. 11, the guide includes the title, page, and descriptions defined in FIG. 10. Additionally, the guide includes the expandable text boxes defined in FIG. 10. FIG. 12 depicts an example of the guide with the text boxes expanded. Both FIG. 10 and FIG. 11 depict an example of the functioning of the guide along with the project template. By allowing the guide generator to link steps to particular pages, the server computer provides options for guiding various users through a complex interface.

Additionally, options may be provided that are specific to the current template. For example, the Run Batch option, when selected, may cause the server computer 100 to display a drop-down menu propagated by batch jobs that have been defined in the template. When the guide is later used, the selected batch job may be displayed as a selectable option. When the user selects the option, the server computer 100 may perform the defined batch job. For example, the batch jobs described in FIG. 13 generate a report after solving the main scenario. While creating the guide, a user may insert an option to run the batch job of FIG. 13. When a future user selects the batch option, the server computer may execute the scenarios of FIG. 13 in order to generate the report. From the perspective of the guide user, a selection of the run batch option in the guide causes creation of the report whereas from the perspective of the server computer, a selection of the run batch option causes the server computer to identify the individual scenarios and perform the functions of those scenarios in the specified order.

Other options based on the template may be defined through the guide. For example, the interface may include an option for adding specific rules or scenarios to the guide. Thus, the user may simply select a "solve scenario" option in the guide in order to execute one or more rules. As the option is displayed in the guide, the user may not need to identify the correct interface for solving the scenario or determine which scenario to solve. The guide thus allows the user to execute complex functions without needing to know how the functions were designed or how they are executed.

As another example, the guide may include options for sending messages, such as emails, from within the guide. Essentially, any selectable item from the template may be selected to be displayed in the guide, thereby allowing the user to perform functions in the guide and have those functions be performed as if selected from the project interface.

Other options include importing and exporting and exporting options as displayed as well as links to other templates or guides. The options depicted in FIG. 10 are not intended to be exhaustive and the guide described herein may be implemented using more or less options. For instance, an additional option may allow the guide creator to specify locations that are updated with values entered into the guide. The guide may include an option that allows the creator to link one or more data fields in the template to a data field in the guide. As an example, the user may create a text box and link the text box to the value for the Item Description on the Constants page. Thus, while the guide is being used, a user may input the description of the item into the guide interface and the server computer 100 may update the value for Item Description with the entered text.

In an embodiment, the guide builder includes options for assigning steps to different individuals. For example, when the user creates a particular step, the user may select one or more user identifiers to be associated with the step. When a future user accesses the guide, the server computer may determine whether an identifier of the future user matches any of the selected identifiers. If the identifier matches, the server computer may display the particular step to the user as part of the guide. If the identifier does not match, the server computer may display the guide without the particular step. Thus, a guide is capable of being associated with both specific projects and specific users. Additionally or alternatively, steps may be assigned based on a position or role of the user. The role may be input by a user when the guide is accessed or determined by the computer system based on stored role data associated with an identifier of the user.

Steps, guides, and actions may also be displayed based on properties of a project. For example, a guide creator may associate the "run batch jobs" option with the existence of batch jobs in the project. Thus, the server computer may determine whether the project contains particular properties and, if the project contains the particular properties, may cause display of the steps, guides, and/or actions.

In an embodiment, guides may be associated with individual users. For example, on creation of a new guide, a user may specify one or more user identifiers, roles, and/or functions for the guide. Thus, for a specific project template, a server computer may store a plurality of guides associated with different identifiers. When a first user attempts to access a guide for a project, the server computer may identify a guide based on a user identifier and select the appropriate guide for the individual. Thus, if a particular project requires different users to perform different tasks, a guide creator may generate guides for each type of user, thereby allowing a single project to be accessed and worked on by a plurality of different users performing different tasks.

The guide may include options that allow a user to indicate a status of a step in the guide. The status options may be defined by the guide creator and/or as part of the platform. For example, an action assigned to a user in the guide may include selectable options for indicating the action has been completed, has not been completed, is erroneous, is not relevant, and/or should be assigned to another user. Thus, a user of the guide may mark different steps of the guide to indicate to both the user and other users the status of different steps. The guide may additionally include options that allow users to take notes within the guide. The notes may be saved for the user's guide, but not other instances of the guide. Thus, if the user closes the guide and later reopens the guide, the notes written by the user may still be displayed within the guide. Additionally or alternatively, the user may create notes that are displayed globally to other users of the guide and/or in the listing of guides.

In an embodiment, the server computer tracks performance of actions in the project and updates the guide. For example, step 1 in FIG. 11 indicates that parameters need to be set with subsections for each parameter. The interface may include an option for linking a step to a portion of the project. Thus, the guide creator may specify that the "Item Description" step has been completed when text has been entered into the value field for the "Item Description" element, such as through a link to the specific field. When a user enters text into the "Item Description" field, the guide may visually indicate that the action has been completed, such as through a check mark next to the Item Description. In this manner, the guide can be used as a tool to track completion of a project for an unsophisticated user.

The server computer may additionally store deadlines for actions in guides. For example, a user may define an action in a guide and a deadline defining a date, time, or period of time by which the action should be completed. The guide may indicate the required action and an amount of time left for the action to be completed. In an embodiment, the guide initially displays a warning when the deadline is approaching and/or the deadline has passed. The warning may be an item within the guide, such as an indicator icon, and/or a change to the display of the guide. For example, a yellow border may flash around the guide when the deadline is approaching and a red border may flash around the guide when the deadline has passed.

In an embodiment, the server computer displays options for generating automatic tasks from the guide. The automated actions may be based on one or more triggers defined by the user. For example, a user may define a trigger of an approaching deadline for an action to cause a reminder message to be sent to a user. The interface may display options for defining the trigger, e.g. that the amount time before a deadline is less than a specified value, and for defining an action, e.g. that a message is automatically sent to a particular user. Automated actions may also be based on completion of tasks. For instance, a user may define an action, such as solving a cherry pick scenario, that is automatically performed after a bidding window closes.

The server computer may additionally store state information for a user's use of the guide. For example, when a user saves a project and/or closes the guide, the server computer may store data identifying a page of the guide the user was on when the guide was saved or closed. When the user reopens the guide and/or project in the future, the server computer may use the stored state information to identify the page of the guide and display the identified page to the user. By tracking the state of the guide, the server computer is able to allow the user to pick up where the user left off.

Guides may be opened manually, at the opening of a project and/or project template, and/or in response to a triggering event. For example, a user may generate a guide for analyzing bids in a project. The user may additionally define, through the graphical user interface, a trigger for opening the guide, such as when more than a threshold number of bids have been received. Thus, when the project is accessed in the future, the guide may be displayed in response to the triggering event occurring. In the present example, when more than the threshold number of bids have been received, the server computer may display the guide for analyzing bids.

Another example of a triggering event is a warning or error produced by the system. For example, a guide may describe actions that can be taken in response to a particular error. When the platform produces the particular error, the server computer may display the guide that describes the actions that can be taken in response to the particular error. Triggering events may additionally include times and/or dates. For instance, a triggering event for a checklist guide may be defined such that the checklist guide is displayed on the first of every month.

Additionally or alternatively, system and/or platform events may be used to display text within the guide. A guide creator may identify one or more items to be displayed in the guide and one or more events to act as a trigger for displaying the items. For example, the guide creator may define text to be displayed in the guide in response to a particular error. As another example, the creator may define a system event to be reported through a section of a guide, such as the platform's progress in generating a report.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
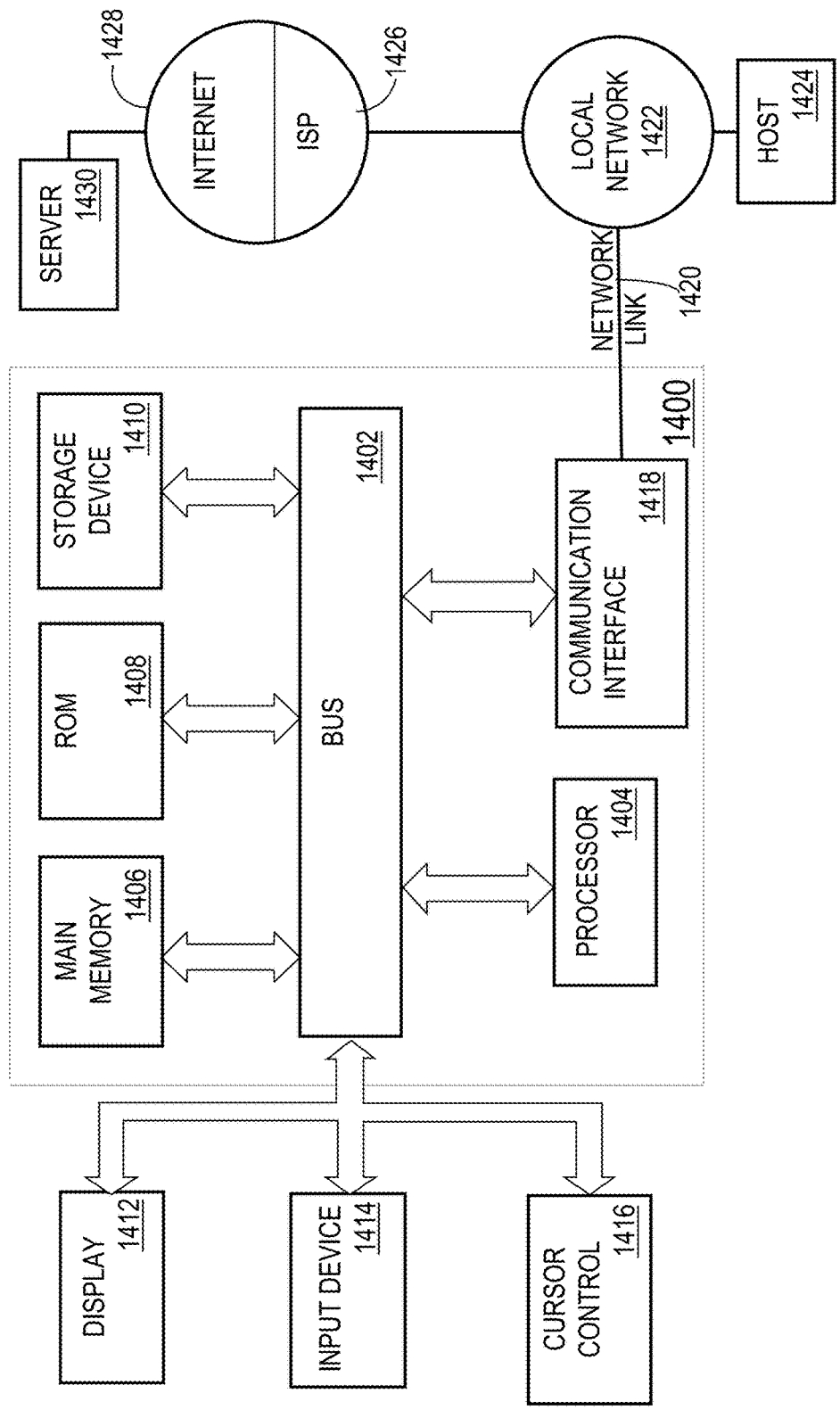
FIG. 14 is a block diagram that illustrates a computer system upon which an embodiment may be implemented.

For example, FIG. 14 is a block diagram that illustrates a computer system 1400 upon which an embodiment may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
   one or more processors;
   a memory storing instructions which, when executed by the one or more processors, cause performance of:
   displaying, through a graphical user interface, one or more first options for defining aspects of a project by customizing a software package to one or more particular use cases;
   receiving, through selection of the one or more first options in the graphical user interface, first user input defining particular aspects of a particular project by customizing a software package to one or more particular use cases;
   wherein the first user input comprises a definition of one or more operations through a first interface page;
   displaying, through the graphical user interface, one or more second options for defining a guide that describes how to use the customized software package to implement the particular project;
   wherein the one or more second options comprise interface page identification options for one or more steps of the guide;
   receiving, through selection of the one or more second options in the graphical user interface, second user input defining a particular guide for the particular project;
   wherein receiving the second user input comprises receiving, through the interface page identification options, input identifying a particular interface page of the customized software package to be associated with a particular step of the guide;
   wherein the second user input comprises inclusion, into the guide, of an option to perform the one or more operations;
   receiving, through the graphical user interface, a request to store the particular project;
   storing the particular aspects of the particular project and the particular guide;
   receiving a request to view the particular project and, in response, displaying the particular guide with the particular project;
   receiving a selection of the particular step of the guide and, in response, displaying the particular interface page of the customized software package;
   wherein displaying the particular guide with the particular project comprises displaying the option to perform the one or more operations without displaying the first interface page;
   receiving a selection of the option to perform the one or more operations through the guide and, in response, performing the one or more operations without displaying the first interface page.

2. The system of claim 1:
   wherein the first user input comprises a definition of a batch operation comprising a plurality of operations;
   wherein the second user input comprises inclusion, into the guide, of a run batch operation;
   wherein displaying the particular guide with the particular project comprises displaying the run batch operation in the guide;
   wherein instructions, when executed by the one or more processors, further cause performance of receiving a selection of the run batch operation and, in response, performing the plurality of operations.

3. The system of claim 1 wherein the second options comprise step generation options and content options for each step.

4. The system of claim 3 wherein the content options include text, images, documents, and links to other guides.

5. The system of claim 1:
   wherein the one or more second options comprise completion identification options for one or more steps of the guide;
   wherein receiving the second user input comprises receiving, through the completion identification options, an identification of one or more actions that complete the one or more steps of the guide;
   wherein the instructions, when executed by the one or more processors, further cause performance of:

while displaying the particular guide with the particular project, receiving third user input performing the one or more actions;

in response to receiving the third user input, display a visual indication that the one or more steps of the guide have been completed.

6. A method comprising:

displaying, through a graphical user interface, one or more first options for defining aspects of a project;

receiving, through selection of the one or more first options in the graphical user interface, first user input defining particular aspects of a particular project by customizing a software package to one or more particular use cases;

wherein the first user input comprises a definition of one or more operations through a first interface page;

displaying, through the graphical user interface, one or more second options for defining a guide that describes how to use the customized software package to implement the particular project;

wherein the one or more second options comprise interface page identification options for one or more steps of the guide;

receiving, through selection of the one or more second options in the graphical user interface, second user input defining a particular guide for the particular project;

wherein receiving the second user input comprises receiving, through the interface page identification options, input identifying a particular interface page of the customized software package to be associated with a particular step of the guide;

wherein the second user input comprises inclusion, into the guide, of an option to perform the one or more operations;

receiving, through the graphical user interface, a request to store the particular project;

storing the particular aspects of the particular project and the particular guide;

receiving a request to view the particular project and, in response, displaying the particular guide with the particular project;

receiving a selection of the particular step of the guide and, in response, displaying the particular interface page of the customized software package;

wherein displaying the particular guide with the particular project comprises displaying the option to perform the one or more operations without displaying the first interface page;

receiving a selection of the option to perform the one or more operations through the guide and, in response, performing the one or more operations without displaying the first interface page.

7. The method of claim 6:

wherein the first user input comprises a definition of a batch operation comprising a plurality of operations;

wherein the second user input comprises inclusion, into the guide, of a run batch operation;

wherein displaying the particular guide with the particular project comprises displaying the run batch operation in the guide;

wherein the method further comprises receiving a selection of the run batch operation and, in response, performing the plurality of operations.

8. The method of claim 6 wherein the second options comprise step generation options and content options for each step.

9. The method of claim 8 wherein the content options include text, images, documents, and links to other guides.

10. The method of claim 6:

wherein the one or more second options comprise completion identification options for one or more steps of the guide;

wherein receiving the second user input comprises receiving, through the completion identification options, an identification of one or more actions that complete the one or more steps of the guide;

wherein the method further comprises:

while displaying the particular guide with the particular project, receiving third user input performing the one or more actions;

in response to receiving the third user input, display a visual indication that the one or more steps of the guide have been completed.

* * * * *